A. B. OLSON.
CORN POPPER.
No. 11,290. Reissued Nov. 29, 1892.
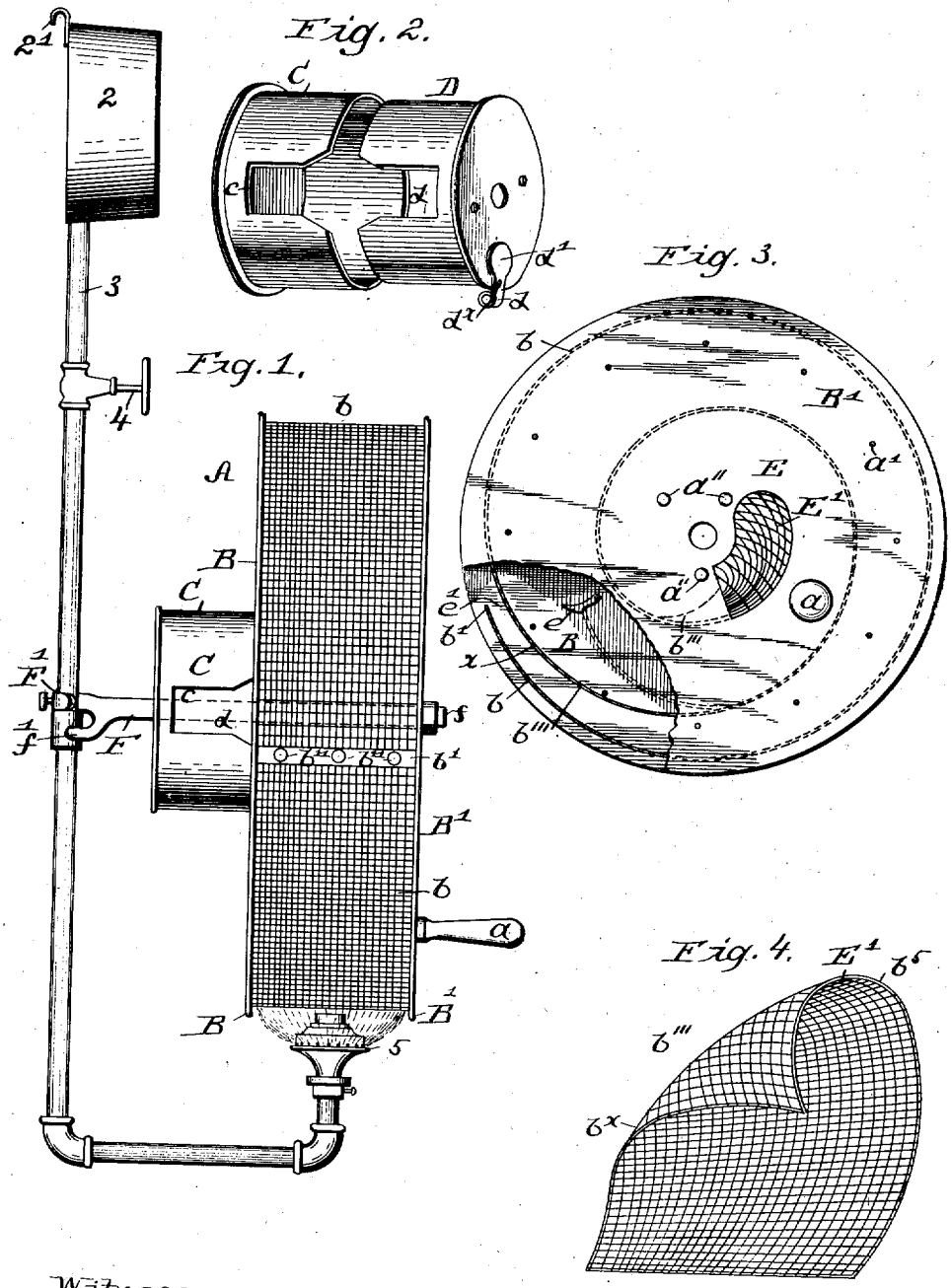
Witnesses:
F. G. Fischer
S. L. C. Hasson
Inventor
Andrew B. Olson
By Richd. H. Manning Atty.

UNITED STATES PATENT OFFICE.

ANDREW B. OLSON, OF KANSAS CITY, MISSOURI.

CORN-POPPER.

SPECIFICATION forming part of Reissued Letters Patent No. 11,290, dated November 29, 1892.

Original No. 428,626, dated May 27, 1890. Application for reissue filed March 15, 1892. Serial No. 425,040.

*To all whom it may concern:*

Be it known that I, ANDREW B. OLSON, a citizen of the United States, residing at Kansas City, in the county of Jackson and State of Missouri, have invented certain new and useful Improvements in Corn-Poppers, of which the following is a full, clear, and exact description, reference being had to the accompanying drawings, forming a part of this specification.

My invention relates to improvements in corn-poppers, having for its object, first, to enable the popped corn to be automatically discharged from the apparatus while being rotated; second, to effect a continuity in a corn-popper case between the interior separating-conveyer and the discharge-opening; third, means for feeding the corn into the screens and allowing only the corn that is popped to pass out through the exit, leaving the small or unpopped corn in the outside screen; fourth, to feed the corn-popper by means of an automatic feed while being rotated; fifth, to prevent large cereals or nuts while being roasted from being carried to the center of the apparatus until fully roasted.

In the drawings, Figure 1 is a side elevation of my improved rotary corn-popper shown connected with an oil-conducting pipe and above a gas-burner. Fig. 2 is a detail view in perspective of the automatic feeding device in which the raw corn is poured, showing the feed-regulating valve. Fig. 3 is a side view of the roaster with a portion of one of the heads broken away to show the convoluted mesh, also showing in dotted lines the position of the detached coarse screen when engaged with the swinging catch. Fig. 4 is a detail view in perspective, showing the coarse wire screen suitably bent to form a chute for the corn after it is popped.

Similar letters and numerals of reference indicate corresponding parts in all the figures.

Referring to the drawings by letters and figures, A represents my improved corn-popping apparatus or case.

B represents the rear and B′ the front coverings or heads of the improved corn-popper and roaster case, said popper and roaster being provided between the front and rear coverings with a circular outer screen or mesh $b$, made of fine wire, which extends entirely around the said apparatus or case in the following manner: To the end of the wire screen $b$, composing the sides of said case, is attached a metallic strip $b'$, which is bent over the upper and lower sides of said end portion of said screen and secured thereto by the rivets $b''$, which extend through the bent portion of said strip and the said screen. One end of the strip $b'$ is then secured rigidly to the inner side of the coverings B, near the periphery of said coverings, and the other end of said strip secured in the same manner to the inner side of the other covering B′. The other end of the screen $b$ is extended entirely around the apparatus and near the periphery of the coverings B B′ and inwardly past the strip $b'$, leaving a space or opening $e'$ between said strip $b'$ and the outer end of the screen $b$, the edges of the screen being secured to the coverings B B′ in the same manner as the strip $b'$.

Close in position to the inner end of the screen $b$ is placed one end of a coarse wire screen or mesh $b'''$, which is nearly of the same width as the screen $b$. The other end of the screen $b'''$ is convoluted between the coverings B B′, and one side portion of the extreme inner end or terminal of said screen adjacent to the inner side of the covering B is bent inwardly toward the other side of said screen, so as to form a cornuted chute E′ at the side of the axis of the apparatus, and thus inclining the mesh toward the outer covering or head B′ and in the direction of the discharge-opening in said head. To enable the corner of crest portion at the terminal of the cornuted mesh to fit against the inner side of the head or covering B′, a short portion of the side of said mesh near said covering B′ is cut away diagonally, as at $b^5$, and the extreme end of the said bent portion cut in a line nearly parallel, as at $b^\times$, with the axis of the apparatus.

Through the covering or head B′ of the apparatus, extending in a line concentric with its axis and a short distance in line with the screen $b$, directly opposite the chute E′, is made a transverse discharge-opening E. Upon the inner side of the covering or head B′, equidistant from the outer fine mesh $b$ and the inner side of the convoluted coarse mesh $b'''$ and upon a line drawn through the point $x$ and the axis of the apparatus, is pivotally attached a swinging catch or hook *e*, which is also in the path of the movable end of the said screen *b'''*.

C is a cup or covering, which fits over or telescopes with a corresponding cup D, said cups being provided with registering openings *c* and *d*, through which the corn is poured. When said cup is filled, the outside cup or covering C is turned in such a manner as to inclose the corn within said cup, as illustrated in Fig. 1. Through the cup D is made a transverse opening, which is closed by the valve *d'*. Through the covering or head B, directly opposite said opening closed by valve *d'*, is a registering opening. (Not shown in the drawings.) The valve *d'* is pivoted at $d^{\times}$ to said cup D near its periphery and is provided with an operating-handle *d*, which extends outwardly beyond the side of said case D. The cup D is secured to the covering or head B by the bolts *a'' a''*. The side coverings or heads are bolted together by suitable tie-rods *a'*, which pass through the heads B B'.

F is a suitable axle or spindle upon which the corn-popper rotates, said spindle being provided with a hook F', by means of which the devices may be secured to a vertical pipe or other suitable standard.

*f'* is a brace, which rests against the pipe and serves to hold the popper in position, said hook F' being so constructed that the popper may swing in any direction or may be raised or lowered to any point and secured by a suitable set-screw.

2 represents a tank, which is designed to hold a quantity of gasoline or other fluid which may be used in the tank, said tank 2 being provided with a suitable hook 2', by which it may be hung to the wall or any projection.

3 is the fluid-conducting pipe, which is provided with a valve 4, said valve 4 being for the purpose of regulating the quantity of fluid which passes from tank 2 through pipe 3 to the burner 5. *a* is the handle for operating the corn-popper.

In the rotation of the corn-popper the raw or unpopped corn passes from the cups C D through the registering openings in the cup D and the head B of the case into the roaster or popper (the amount being regulated by means of the valve *d'*) and falls through the coarse screen *b'''* upon the inner side of the fine exterior screen *b*. With each revolution of the roaster or popper-case the corn by gravity falls to the lowest point in said case, which is immediately above the flame from the burner 5, and as the corn pops it becomes too large to fall through the coarse screen *b'''* when it reaches the point *x*, (where the ends of the coarse and fine wire are adjacent to each other,) and thus being separated from the unpopped corn the popped corn is conveyed to the chute E' and is discharged automatically through the opening E, leaving the small unpopped grains to drop through the coarse sieve *b'''* back to the fine sieve *b*, where it passes through the same operation as before, the outward passage of the popped corn being unbroken in quantity by means of the continuity between the conveyer-sieve *b'''* and discharge-opening obtained by the chute at the terminal of the said conveyer-sieve *b'''*. This operation is repeated until there remains a quantity of the corn which will not pop.

In popping corn there is always a small quantity which will not pop at all. This of course remains in the fine sieve *b*, and when it is found necessary to remove it a reverse movement is given to the corn-popper case, allowing the small grains to drop out through the opening *e'*.

When it is desired to roast peanuts, chestnuts, &c., and without discharging the nuts until subjected to heat the requisite space of time, the movable end of the coarse mesh, is thrown out of position toward the axis of the corn-popper case, as seen in dotted lines in Fig. 3, and which end is engaged by the hook or catch *e* and retained thereby. When the nuts become sufficiently roasted, a slight movement is given to the hook, so as to detach it from the movable end of the sieve and permit it to move into line with the fine mesh *b*.

The two ends of the coarse and fine mesh adjacent to each other may be united together, if preferred, when only corn is popped therein.

Having fully described my invention, what I now claim as new, and desire to secure by Letters Patent, is—

1. A corn-popper consisting of a case having a suitable discharge-opening and an interior perforated conveyer having a terminal cornuted chute, substantially as and for the purpose described.

2. A corn-popper consisting of a case having a suitable discharge-opening, an interior perforated conveyer, and a chute at the terminal of said conveyer, substantially as and for the purpose described.

3. A corn-popper consisting of a case having a suitable discharge-opening, an interior convoluted perforated conveyer, and a chute at the terminal of said convoluted conveyer, substantially as and for the purpose described.

4. In a corn-popper, a revoluble case having a suitable discharge-opening near the axis of said case, and an exterior screen composed of fine mesh forming the sides of said case, and an interior convoluted screen composed of coarse mesh having a cornuted terminal portion inclined in the direction of said discharge-opening, substantially as and for the purpose described.

5. In a corn-popper, a revoluble case having heads and an exterior and interior conveyer consisting of a single convoluted mesh, one portion of said conveyer having fine screen and the other coarse and one of said parts movable in respect to the other within the compass of the exterior screen, substantially as and for the purpose described.

6. In corn-poppers, a revoluble case having a transverse discharge-opening near the axis of said case, an exterior screen having fine mesh composing the sides of said case and having a transverse discharge-opening, a cornuted chute opposite said discharge-opening near the axis of said case, and an interior convoluted conveyer having coarse mesh communicating with said discharge-opening and with said cornuted chute, substantially as and for the purpose described.

7. In a corn-popper, a revoluble case having heads and a transverse discharge-opening in one of said heads, an exterior screen composing the sides of said case having fine mesh, a chute opposite said discharge-opening in the side of said head, and a convoluted perforate conveyer having coarse mesh connected with said heads, having one end connected with said chute and the other movable toward the axis of said case, substantially as and for the purpose described.

8. In a corn-popper, a revoluble case having heads and a transverse discharge-opening in one of said heads, and sides to said case having concentric parts and a discharge-opening between said parts, and an interior convoluted perforate conveyer in communication with one of said concentric parts, and one end of said conveyer movable toward the axis of said case, and a catch supporting said movable end, substantially as and for the purpose described.

9. In a corn-popper consisting of a revoluble case having heads and a transverse feed-opening in one of said heads and sides to said case, the combination of telescopic cups having the bottom of one of said cups connected with one of said heads and having a feed-opening registering with the feed-opening on said head, substantially as and for the purpose described.

10. In a corn-popper consisting of a revoluble case having heads and a transverse feed-opening in one of said heads and a screen composing the sides of said case, the combination of telescopic cups having registering supply-openings in the sides of said cups, and a feed-opening in the bottom of one of said cups registering with the feed-opening in said head, substantially as and for the purpose described.

ANDREW B. OLSON.

Witnesses:
H. R. TOMLINSON,
S. L. C. HASSON.